No. 724,557. PATENTED APR. 7, 1903.
G. P. DORRIS.
GEARING FOR AUTOMOBILES.
APPLICATION FILED JUNE 23, 1902.
NO MODEL.
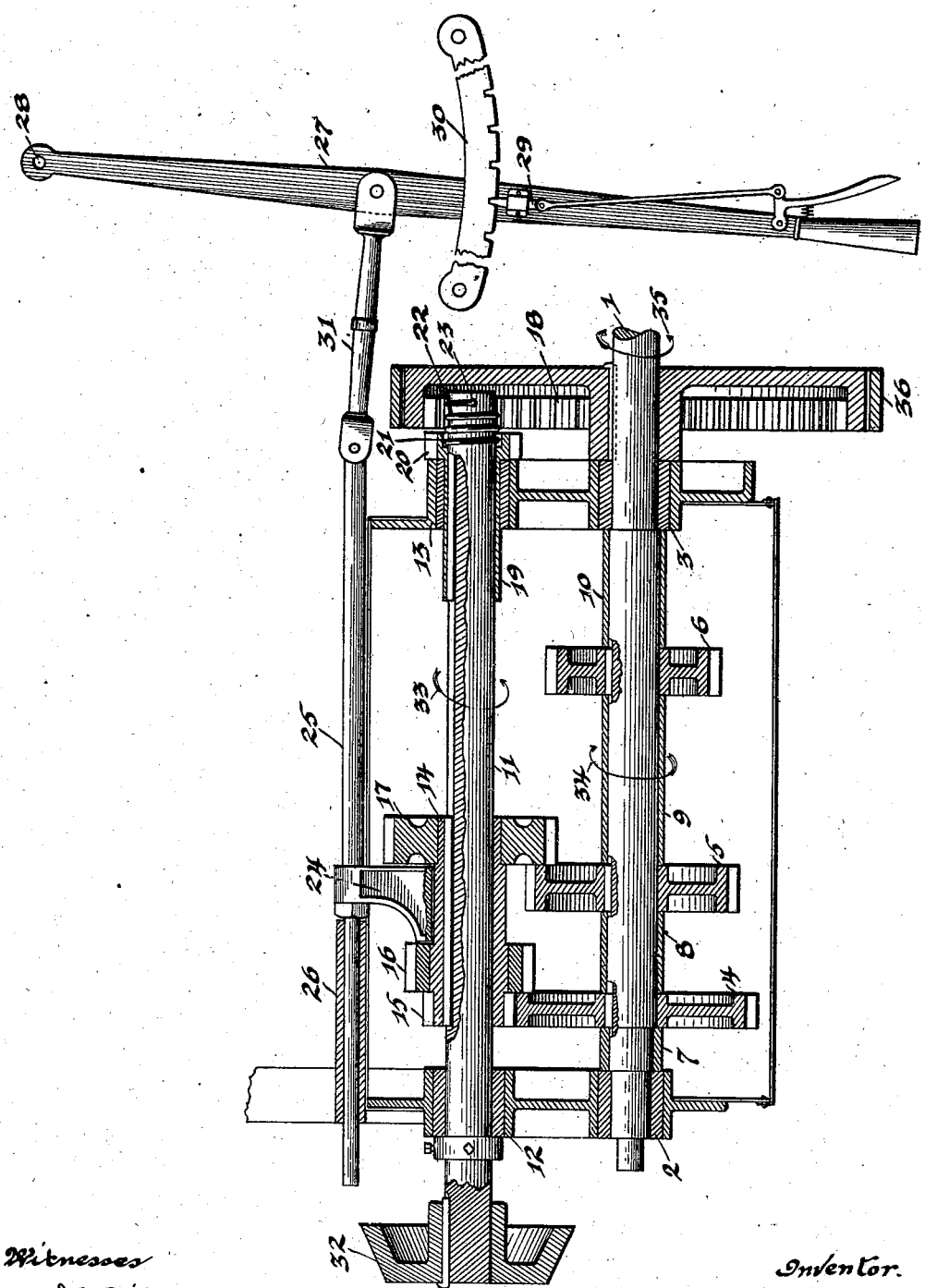

UNITED STATES PATENT OFFICE.

GEORGE P. DORRIS, OF ST. LOUIS, MISSOURI.

GEARING FOR AUTOMOBILES.

SPECIFICATION forming part of Letters Patent No. 724,557, dated April 7, 1903.

Application filed June 23, 1902. Serial No. 112,861. (No model.)

*To all whom it may concern:*

Be it known that I, GEORGE P. DORRIS, of the city of St. Louis, State of Missouri, have invented certain new and useful Improvements in Gearing for Automobiles, of which the following is a full, clear, and exact description, reference being had to the accompanying drawings, forming a part hereof.

My object is to construct an improved automobile reversing-gear; and my invention consists of the novel features herein shown, described, and claimed.

The drawing is a sectional detail of a reversing-gear embodying the principles of my invention.

Referring to the drawing in detail, power is transmitted from the shaft 1 to the traction-wheels in any suitable way, (not shown,) the said shaft being mounted in bearings 2 and 3. Spur-gears 4, 5, and 6 are mounted upon the shaft 1 between the bearings 2 and 3 and held in place by the space-collars 7, 8, 9, and 10, said spur-gears being graduated in size and suitably located relative to each other. The shaft 11 is mounted in the bearings 12 and 13 parallel with the shaft 1, and a sleeve 14 is splined upon the shaft 11, said sleeve carrying the spur-gears 15, 16, and 17, said gears 15, 16, and 17 being adapted to mesh with the gears 4, 5, and 6, respectively. An internal gear 18 is rigidly fixed upon the shaft 1 outside of the bearing 3. A gear-carrying sleeve 19 is splined upon the shaft 11 through the bearing 13, and the spur-gear 20, carried by the outer end of said sleeve, is adapted to slide into and out of mesh with the internal gear 18, the outer end of said spur-gear having a recess 21 around the shaft and the expansive coil-spring 22 is placed around the shaft in said recess, the outer end of said spring being inserted into a cross-bore 23 in the shaft to hold the spring in position, so that the tension of the spring is exerted to hold the gear 20 yieldingly out of engagement with the internal gear and so that when the sleeve 14 is moved on the shaft 11 to strike the sleeve 19 continued movement of the sleeve 14 will overcome the tension of the spring 22 and slide the gear 20 into mesh with the internal gear 18.

A fork 24 engages the sleeve 14 between the gears 16 and 17, the outer end of said fork being secured to the sliding shaft 25, and said shaft operates in the bearing 26. The operating-lever 27 is pivoted at the end 28 to any suitable part of the frame (not shown) and carries the locking mechanism 29 to engage the locking-rack 30. A connecting-rod 31 connects the lever 27 to the shaft 25. A friction-clutch member 32 is fixed upon the shaft 11 to receive the power from the motor.

The gears 4, 5, and 6 upon the shaft 1 and the gears 15, 16, and 17 upon the shaft 11 constitute the ordinary speed-changing gearing.

The gear 15 meshes with the gear 4 when a slow speed is desired, and when a moderate speed is desired the lever 27 is operated to slide the sleeve 14 to carry the gear 15 out of mesh with the gear 4 and cause the gear 16 to mesh with the gear 5. If a high speed is desired, the lever 27 is still further operated to carry the gear 16 out of mesh with the gear 5 and cause the gear 17 to mesh with the gear 6.

If it is desired to reverse the gear to back up the vehicle, the vehicle should be first brought to a stop, or nearly so, and then the lever 27 is still further operated to cause the sleeve 14 to strike the sleeve 19 and slide the gear 20 into mesh with the internal gear 18.

Assuming that the shaft 11 normally travels in the direction indicated by the arrow 33, then the shaft 1 will travel in the direction indicated by the arrow 34. Then if the sleeve 19 is operated to mesh the gear 20 with the gear 18 and reverse the vehicle the shaft 1 will travel in the direction indicated by the arrow 35.

It is obvious that my invention greatly simplifies the construction of the reversing-gears by the manner in which it is combined with the speed-changing gears and that the operation is simplified by the combination which provides for the operation of the reversing-gear through the same mechanism that operates the speed-changing gear. Thus I effect a great saving in the cost of construction as well as a great saving in the labor of operation.

36 indicates an ordinary strap-brake applied to the external periphery of the gear 18.

Of course it is obvious that instead of the strap-brake 36 I may use the ordinary brakeblocks of wood or other material to engage the outer periphery of the said gear 18.

I claim—

1. An automobile reversing-gear consisting of the combination with speed-changing spur-gears and their shafts; of an internal gear fixed upon one of the spur-gear shafts; a pinion splined upon the other spur-gear shaft; and means for moving said pinion into and out of mesh with the internal gear; substantially as specified.

2. An automobile reversing-gearing consisting of speed-changing spur-gears; shafts for said gears; an internal gear fixed upon one of the spur-gear shafts; a pinion splined upon the other spur-gear shaft; a spring to hold said pinion normally out of mesh with the internal gear; and means for overcoming the tension of said spring to move the pinion into mesh with the internal gear; substantially as specified.

3. An automobile reversing-gear consisting of speed-changing spur-gears; shafts for said gears; an internal gear fixed upon one of the spur-gear shafts; and a pinion splined upon the other spur-gear shaft, and adapted to move into and out of mesh with the internal gear, and adapted to be operated through the same mechanism that operates the speed-changing gears; substantially as specified.

In testimony whereof I affix my signature in presence of two witnesses.

GEORGE P. DORRIS.

Witnesses:
ALFRED A. EICKS,
M. G. IRION.